(12) United States Patent
Dotzler

(10) Patent No.: US 10,210,762 B1
(45) Date of Patent: Feb. 19, 2019

(54) VEHICLE-TO-VEHICLE COMMUNICATIONS MANAGEMENT FOR DISABLED VEHICLE

(71) Applicant: DENSO International America, Inc., Southfield, MI (US)

(72) Inventor: Kevin Dotzler, Poway, CA (US)

(73) Assignee: DENSO International America, Inc., Southfield, MI (US)

(*) Notice: Subject to any disclaimer, the term of this patent is extended or adjusted under 35 U.S.C. 154(b) by 0 days.

(21) Appl. No.: 15/716,813

(22) Filed: Sep. 27, 2017

(51) Int. Cl.
| | |
|---|---|
| *G08G 1/0965* | (2006.01) |
| *G08G 1/087* | (2006.01) |
| *G08B 1/08* | (2006.01) |
| *G08G 1/00* | (2006.01) |
| *G07C 5/00* | (2006.01) |
| *G08G 1/16* | (2006.01) |

(52) U.S. Cl.
CPC ............ *G08G 1/205* (2013.01); *G07C 5/008* (2013.01); *G08G 1/162* (2013.01); *B64C 2201/122* (2013.01); *G01S 2205/006* (2013.01)

(58) Field of Classification Search
CPC ..................................................... G08G 1/205
See application file for complete search history.

(56) References Cited

U.S. PATENT DOCUMENTS

| | | | |
|---|---|---|---|
| 6,236,337 B1 | 5/2001 | Beier et al. | |
| 2012/0173901 A1* | 7/2012 | Soliman | H04W 88/182 713/320 |
| 2012/0280830 A1* | 11/2012 | Heath | H01M 6/50 340/870.02 |
| 2013/0095770 A1* | 4/2013 | Moshfeghi | H04W 88/06 455/73 |
| 2015/0230168 A1* | 8/2015 | Sawai | H04W 48/20 370/254 |
| 2018/0129534 A1* | 5/2018 | Iyigun | G06F 1/08 |

FOREIGN PATENT DOCUMENTS

CN            104635243 A      5/2015

* cited by examiner

*Primary Examiner* — Joseph H Feild
*Assistant Examiner* — Pameshanand Mahase
(74) *Attorney, Agent, or Firm* — Harness, Dickey & Pierce, P.L.C.

(57) ABSTRACT

The present teachings provide for a search and rescue system including a first control module for a first vehicle. The first control module is configured to identify when the first vehicle is in a distressed situation based on inputs received from a vehicle status sensor, and generate an emergency message including information regarding the distressed situation. A first transmitter for the first vehicle transmits the emergency message by way of a first antenna. A first receiver for the first vehicle receives a second basic safety message from a second vehicle. A battery powers the first transmitter and the first receiver. A battery management module is configured to measure a charge level of the battery and notify the first control module of the charge level of the battery.

20 Claims, 7 Drawing Sheets

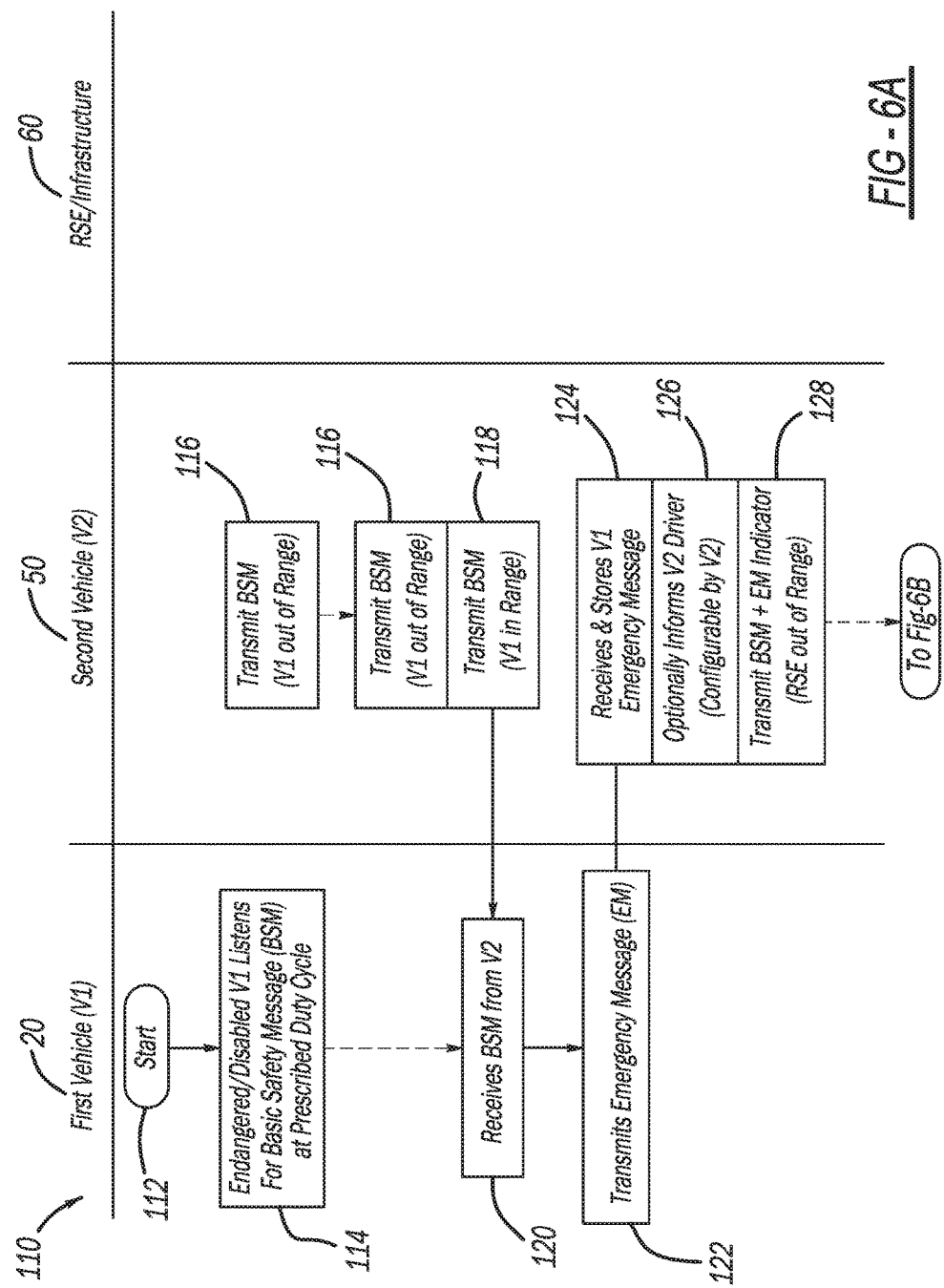

VEHICLE-TO-VEHICLE COMMUNICATIONS MANAGEMENT FOR DISABLED VEHICLE

FIELD

The present disclosure relates to vehicle-to-vehicle communications management for a disabled vehicle.

BACKGROUND

This section provides background information related to the present disclosure, which is not necessarily prior art.

Vehicles that become disabled at an off-road location, such as in a ditch or on a hillside below a road, are often difficult for emergency personnel to locate. A search and rescue system that can reliably locate a vehicle that has been disabled at such a location, and can conserve battery power of the disabled vehicle, would therefore be desirable. The present teachings provide for such a search and rescue system, which provides numerous advantages as set forth herein. One skilled in the art will recognize that the present teachings provide numerous additional advantages as well.

SUMMARY

This section provides a general summary of the disclosure, and is not a comprehensive disclosure of its full scope or all of its features.

The present teachings provide for a search and rescue system including a first control module for a first vehicle. The first control module is configured to identify when the first vehicle is in a distressed situation based on inputs received from a vehicle status sensor, and generate an emergency message including information regarding the distressed situation. A first transmitter for the first vehicle transmits the emergency message by way of a first antenna. A first receiver for the first vehicle receives a second basic safety message from a second vehicle. A battery powers the first transmitter and the first receiver. A battery management module is configured to measure a charge level of the battery and notify the first control module of the charge level of the battery.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6A and FIG. 6B illustrate exemplary message flow between the first vehicle, the second vehicle, and roadside equipment/infrastructure in accordance with the search and rescue system of the present teachings.

Corresponding reference numerals indicate corresponding parts throughout the several views of the drawings.

DETAILED DESCRIPTION

Example embodiments will now be described more fully with reference to the accompanying drawings.

Figure 1:
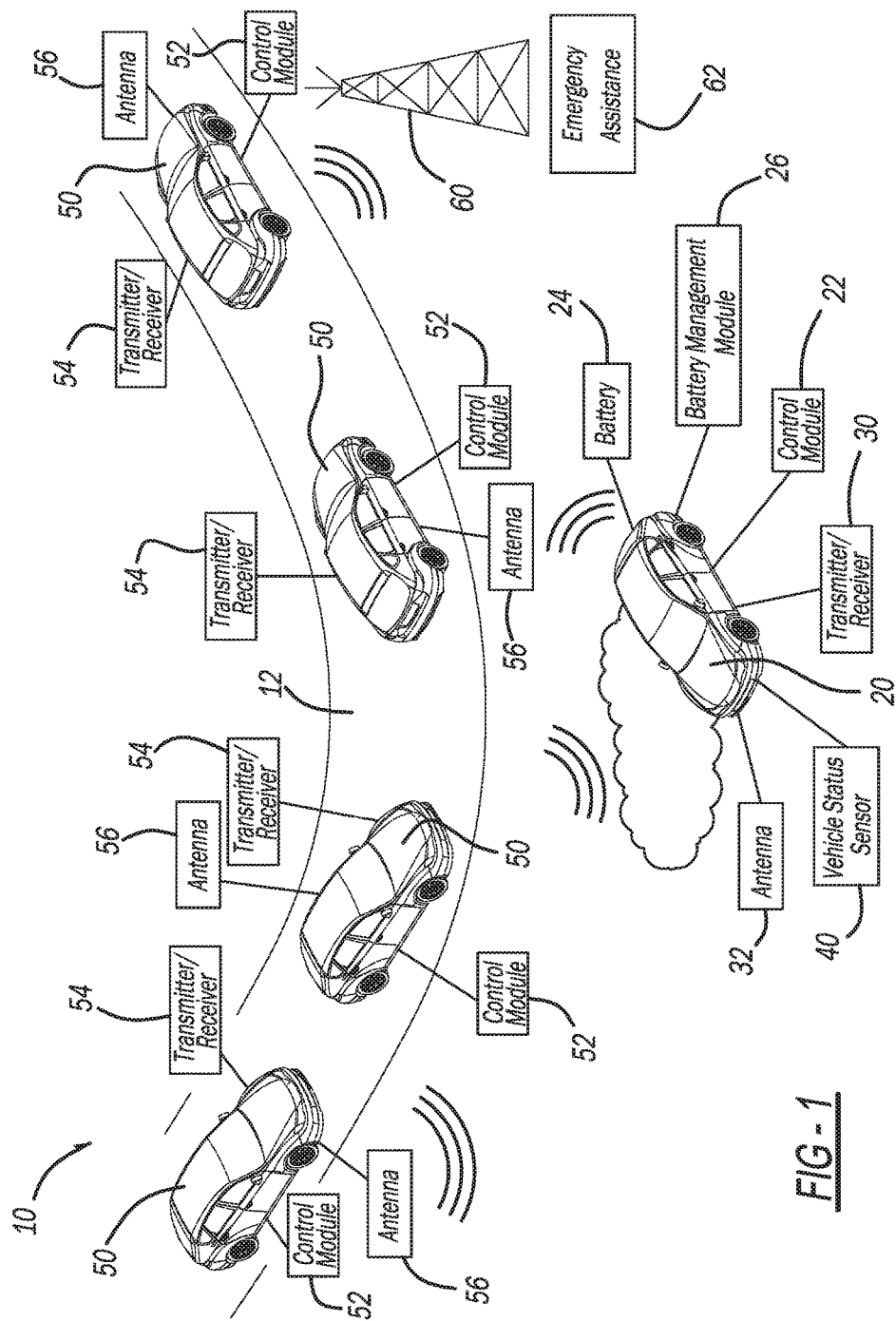
FIG. 1 illustrates a search and rescue system in accordance with the present teachings in which an emergency message broadcast by a disabled first vehicle is relayed to emergency assistance personnel by way of a second vehicle and roadside equipment in the form of a roadside receiver.

With initial reference to FIG. 1, a search and rescue system in accordance with the present teachings is illustrated at reference numeral 10. The system 10 is particularly useful for providing emergency assistance to a first vehicle 20, which has become disabled at an off-road location away from road 12. The first vehicle 20 can be any suitable vehicle, such as a passenger vehicle, mass transit vehicle, military vehicle, construction equipment/vehicle, motorcycle, all-terrain vehicle, etc. One skilled in the art will appreciate that the system 10 in accordance with the present teachings is applicable to non-land-based vehicles as well. For example, system 10 can also be used to locate a watercraft, such as a watercraft that has been disabled along a shore of a body of water out of view of those passing by, or at a water-based location that is otherwise obstructed.

The first vehicle 20 includes a control module 22. In this application the terms "module" and "control module" may each be replaced with the term "circuit." The terms "module" and "control module" may refer to, be part of, or include processor hardware (shared, dedicated, or group) that executes code and memory hardware (shared, dedicated, or group) that stores code executed by the processor hardware. The code is configured to provide the features described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The first vehicle 20 further includes a battery 24 for powering any suitable devices/modules, such as a battery management module 26 and/or a transmitter/receiver 30. As described further herein, the battery management module 26 is configured to manage operation of the transmitter/receiver 30 when the first vehicle 20 is disabled so as to conserve the battery 24. The transmitter/receiver 30 is any suitable transmitter/receiver 30 for broadcasting and receiving messages by way of an antenna 32 for the first vehicle 20.

The control module 22 is configured to generate basic safety messages (BSMs) of the first vehicle 20. The BSMs can include any suitable information regarding the first vehicle 20, such as, but not limited to, the following: current position; heading; previous positions; previous travel routes, etc. The control module 22 operates the transmitter/receiver 30 to transmit BSMs using any suitable vehicle-to-everything (V2X) (including vehicle-to-vehicle (V2V)) wireless communications, such as through a dedicated short-range communication (DSRC) network.

The control module 22 is further configured to determine when the vehicle 20 has become disabled. The control module 22 determines when the vehicle 20 has been disabled in any suitable manner, such as based on information received from one or more vehicle status sensors 40. The vehicle status sensors 40 can be any suitable sensors, such as, but not limited to, rollover sensors, airbag deployment sensors, disabled engine sensors, flat tire sensors, etc. Based on the vehicle status sensors 40, the control module 22 identifies the reason for the first vehicle 20 being disabled, and generates an emergency message (EM) identifying the disabled condition of the first vehicle 20. The control module 22 operates the transmitter/receiver 30 to transmit the EM by way of the antenna 32 in the manner described herein.

The second vehicle 50 generally includes a control module 52, a transmitter/receiver 54, and an antenna 56. The control module 52 is configured to control the transmitter/receiver 54 to transmit and receive vehicle-to-vehicle communications by way of the antenna 56. For example, the control module 52 is configured to generate BSMs for the second vehicle 50, which include various information regarding the second vehicle 50. For example, the BSMs generated by the control module 52 may include information regarding the current position, speed, heading, previous positions, and previous travel routes of the second vehicle 50. The control module 52 operates the transmitter/receiver 54 to transmit the BSMs by way of the antenna 56 at any suitable frequency and regularity.

The control module 52 of the second vehicle 50 is also configured to receive BSMs transmitted by the first vehicle 20, as well as emergency messages (EMs) transmitted by the first vehicle 20. Specifically, the BSMs and EMs transmitted by the vehicle 20 are received by the transmitter/receiver 54 by way of the antenna 56 of the second vehicle 50. The BSMs and EMs of the first vehicle 20 are saved by the control module 52, and may be read or otherwise processed by the control module 52. The control module 52 may generate a receipt message indicating that the BSM and/or EM transmitted by the first vehicle 20 has been received, and may transmit the receipt message to the first vehicle 20 using the transmitter/receiver 54 and the antenna 56 of the second vehicle 50.

The control module 52 of the second vehicle 50 is optionally further configured to notify occupants of the second vehicle 50 that a BSM and/or EM has been received from the first vehicle 20. The control module 52 may further provide information of the BSM and/or EM of the first vehicle 20 to occupants of the second vehicle 50 in any suitable manner, such as through any suitable interface of the second vehicle 50 (e.g., a display screen or any suitable audible alert/notification system). The control module 52 is further configured to transmit an EM received from the first vehicle 20 by way of the transmitter/receiver 54 and the antenna 56. The control module 52 can transmit the EM directly to any suitable roadside equipment (RSE), such as a roadside receiver/antenna 60 as illustrated in FIG. 1. The EM of the first vehicle 20 can be transmitted directly to the RSE 60, or relayed to the RSE 60 by another vehicle, such as a land-based vehicle or an aerial drone, as explained herein.

Detailed message flow of the search and rescue system 10 will be described further herein. In general, however, message flow in the example of FIG. 1 can be as follows. When the control module 22 of the first vehicle 20 determines that the first vehicle 20 is disabled, the control module 22 will assemble a BSM and an EM for the vehicle 20. If the control module 22 determines that the engine of the first vehicle 20 is running, so as to charge the battery 24, the control module 22 will transmit the BSM by way of the transmitter/receiver 30 and the antenna 32. If the engine of the first vehicle 20 is not running, the control module 22 obtains the charge level of the battery 24 from the battery management module 26. If the battery 24 has a sufficiently high charge, the control module 22 will instruct the transmitter/receiver 30 and the antenna 32 to transmit the BSM for the first vehicle 20. If the charge of the battery 24 is not at or greater than a predetermined charge level, the control module 22 will reduce the frequency of the transmission of the BSM, or not transmit the BSM until a BSM of the second vehicle 50 is received.

Once the second vehicle 50 is close enough to the first vehicle 20 to permit communication therebetween, the second vehicle 50 will receive the BSM of the first vehicle 20. The BSM of the first vehicle 20 will be coupled to, or followed by, the EM of the first vehicle 20. Upon receipt of the EM, the second vehicle 50 will store the EM at the control module 52, or at any other suitable location. When the second vehicle 50 is within communications range of the RSE 60, the control module 52 of the second vehicle 50 will transmit the EM to the RSE 60 by way of the transmitter/receiver 54 and the antenna 56. The EM for the first vehicle 20 will then be relayed to emergency assistance personnel 62 in any suitable manner. The emergency assistance personnel 62 will then use the information of the EM to locate and render assistance to the first vehicle 20 and the occupants thereof.

Figure 2:
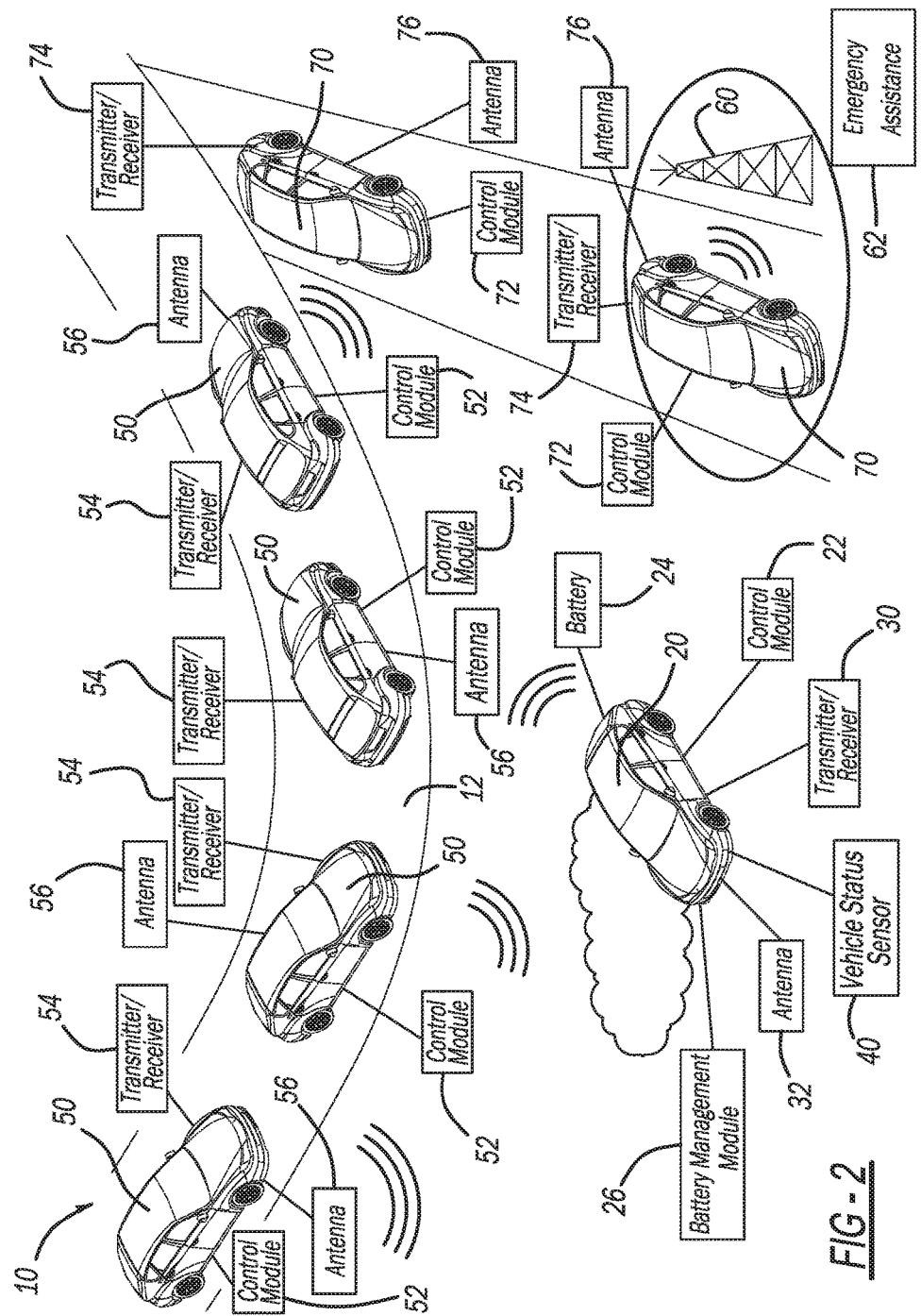
FIG. 2 illustrates the search and rescue system according to the present teachings in which the emergency message broadcast by the disabled first vehicle is relayed to emergency assistance personnel by way of the second vehicle, a third vehicle, and roadside equipment in the form of a roadside receiver.

FIG. 2 illustrates an exemplary situation in which the second vehicle 50 does not pass within the range of the RSE 60, but a third vehicle 70 does. In this example, the control module 52 of the second vehicle 50 transmits the EM to the third vehicle 70, which ultimately transmits the EM to the RSE 60 when the third vehicle 70 is within the range of the RSE 60. More specifically, the third vehicle 70 includes a control module 72, a transmitter/receiver 74, and an antenna 76. The control module 72 receives the EM by way of the transmitter/receiver 74 and the antenna 76 from the second vehicle 50. The control module 72 can store the EM, or the EM can be stored in any other suitable manner. When the control module 72 detects that the third vehicle 70 is within communications range of the RSE 60, the control module 72 instructs the transmitter/receiver 74 to transmit the EM to the RSE 60 by way of the antenna 76. The control module 72 may further be configured to alert a driver of the third vehicle 70 that an EM has been received. The control module 72 may also make some or all of the information included in the EM available to occupants of the third vehicle 70 for use in any suitable manner, such as to facilitate rendering assistance to the first vehicle 20.

Figure 3:
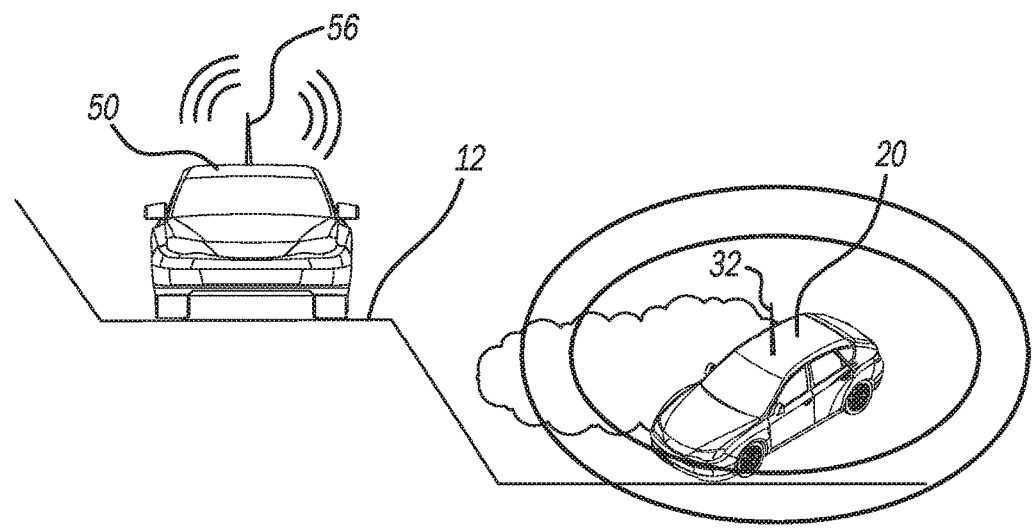
FIG. 3 illustrates the search and rescue system in accordance with the present teachings for locating the disabled first vehicle when the disabled first vehicle is down a ditch or hillside relative to the road and the second vehicle, which may be a search vehicle.

With reference to FIG. 3, the antenna 32 of the first vehicle 20 can be a vertically polarized, omni-directional antenna. The antenna 56 of the second vehicle 50 can be a bi-directional antenna that can be oriented in a plurality of different directions. Providing the antenna 56 of the second vehicle 50 as a bi-directional antenna advantageously allows the antenna 56 to be focused in any suitable direction. In the example of FIG. 3, the antenna 56 is advantageously focused upwards and downwards along a hillside that the road 12 runs along. Thus if the vehicle 20 is disabled below the road 12 as illustrated, the antenna 56 of the second vehicle 50 can effectively communicate with the antenna 32 of the first vehicle 20.

Figure 4:
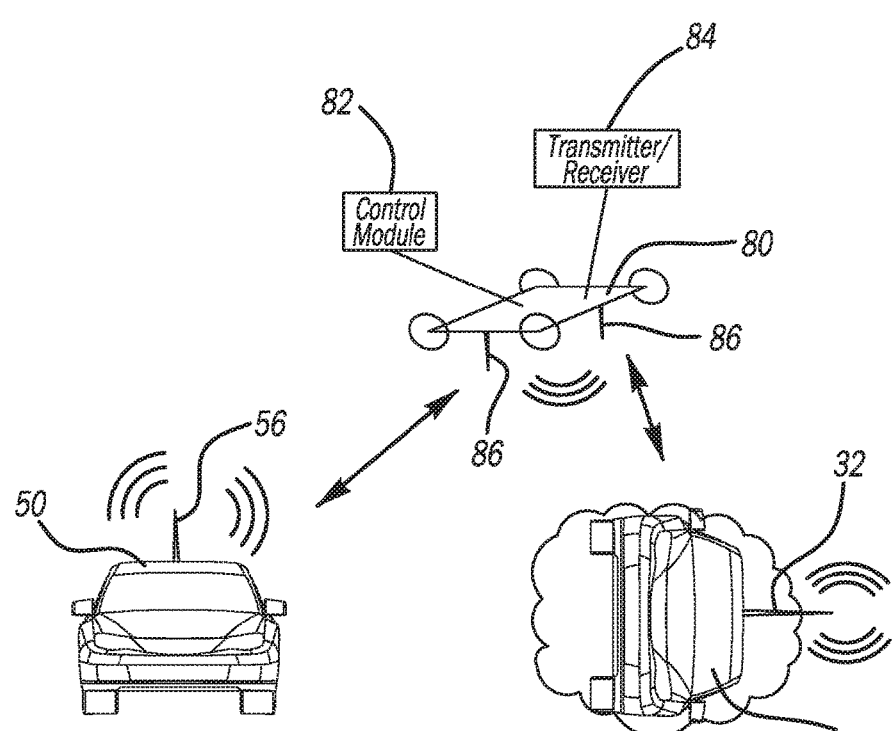
FIG. 4 illustrates the search and rescue system in accordance with the present teachings including an aerial vehicle that relays an emergency message transmitted by the disabled first vehicle to the second vehicle.

With reference to FIG. 4, the search and rescue system 10 of the present teachings further includes an aerial vehicle to facilitate communications between the first and second vehicles 20 and 50. The aerial vehicle 80 can be any suitable aerial vehicle, such as a drone, balloon, helicopter, etc. The aerial vehicle 80 can be any suitable manned or unmanned aerial vehicle. The aerial vehicle 80 generally includes a control module 82, a transmitter/receiver 84, and an antenna 86. The antenna 86 can be any suitable antenna, such as a 180° omni-directional antennal. The aerial vehicle 80 can be positioned within communications range of the second vehicle 50 in order to relay communications between the first and second vehicles 20 and 50 when they themselves are not within communications range of one another. Furthermore, should the first vehicle 20 be turned on its side as illustrated in FIG. 4, the aerial vehicle 80, and specifically the antenna 86 thereof, will be in a better position to communicate with the antenna 32 of the first vehicle 20 than the second vehicle 50. Specifically, when the first vehicle 20 is turned on its side, the vertically polarized, omni-directional antenna 32 of the first vehicle 20 will be oriented such that communication signals are oriented upward towards the aerial vehicle 80, and not towards the second vehicle 50. Thus the aerial vehicle 80 will be in a better position to communicate with the first vehicle 20.

Figure 5:
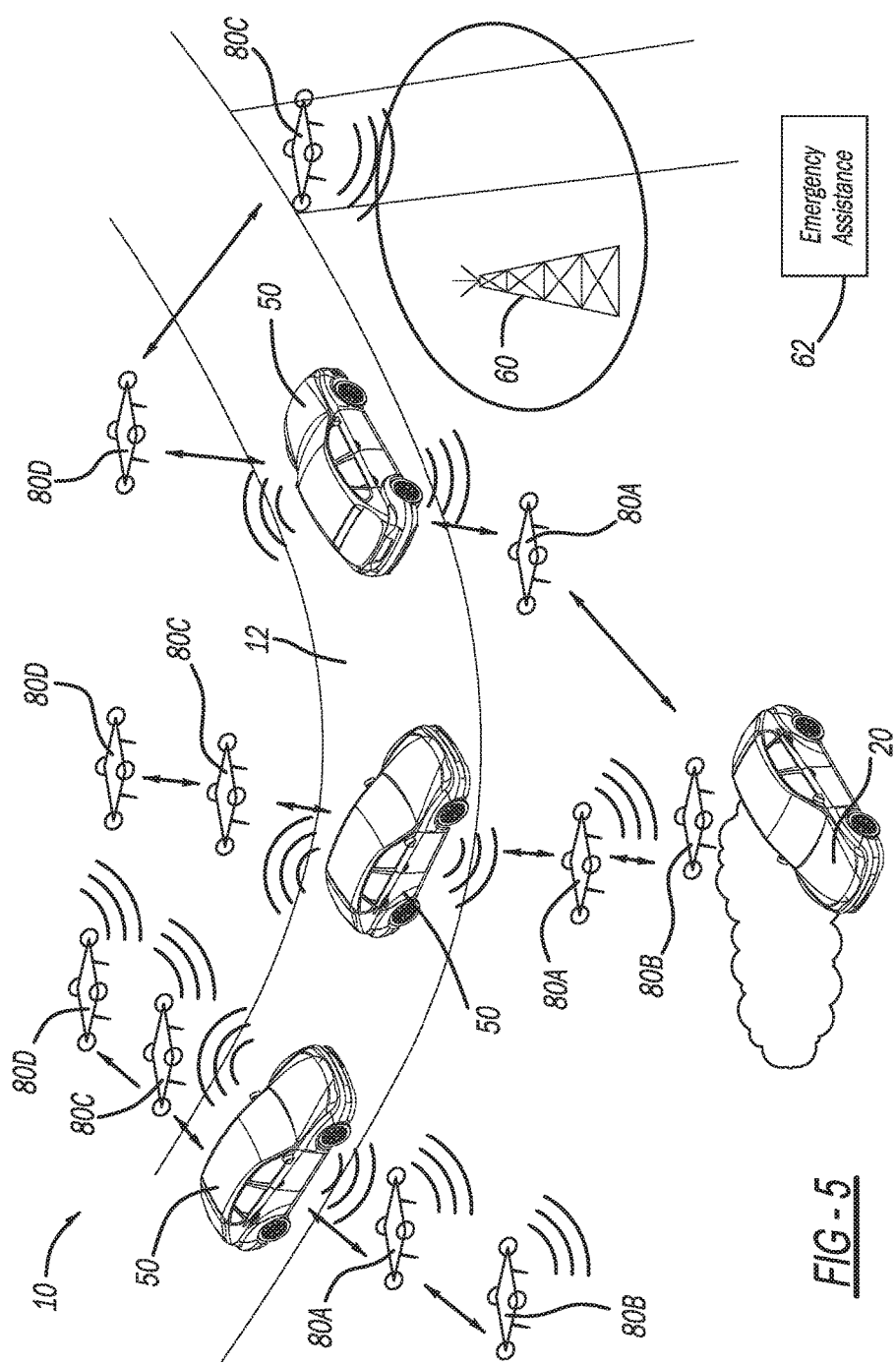
FIG. 5 illustrates the search and rescue system in accordance with the present teachings including a plurality of aerial vehicles for relaying messages between the disabled first vehicle and the second vehicle, as well as roadside equipment taking the form of a receiver.

With reference to FIG. 5, a plurality of aerial vehicles 80A, 80B, 80C, and 80D can be used to facilitate communications between the first vehicle 20 and the second vehicle 50. FIG. 5 illustrates two aerial vehicles 80A and 80B on a right side of the second vehicle 50, and two aerial vehicles 80C and 80D on a left side of the second vehicle 50. However, any suitable number of aerial vehicles 80 can be used, and arranged in any suitable pattern. Each one of the aerial vehicles 80A-80D can include the control module 82, the transmitter/receiver 84, and the antenna 86 to provide communication with the first and second vehicles 20 and 50, as well as other aerial vehicles 80A-80D. The second vehicle 50 can be a support vehicle for one or more of the aerial vehicles 80, such as to transport, store, charge, service, exchange data with, and/or control the aerial vehicles 80. For example, the second control module 52 of the second vehicle 50 can guide one or more of the aerial vehicles 80 to the road-side equipment 60.

In the example of FIG. 5, aerial vehicle 80B is within range of the first vehicle 20. The aerial vehicle 80B relays communications with the first vehicle 20 to aerial vehicle 80A, which then relays communications to the second vehicle 50. Specifically, an EM transmitted by the vehicle 20 can be received by the aerial vehicle 80B, which can then relay the EM to the aerial vehicle 80A. The aerial vehicle 80A then relays the EM to the second vehicle 50. The second vehicle 50 can relay the EM to the RSE 60 either directly or by way of another vehicle. In the example illustrated in FIG. 5, the second vehicle 50 relays the EM to the RSE 60 by way of aerial vehicle 80D and aerial vehicle 80C.

Figure 6B:
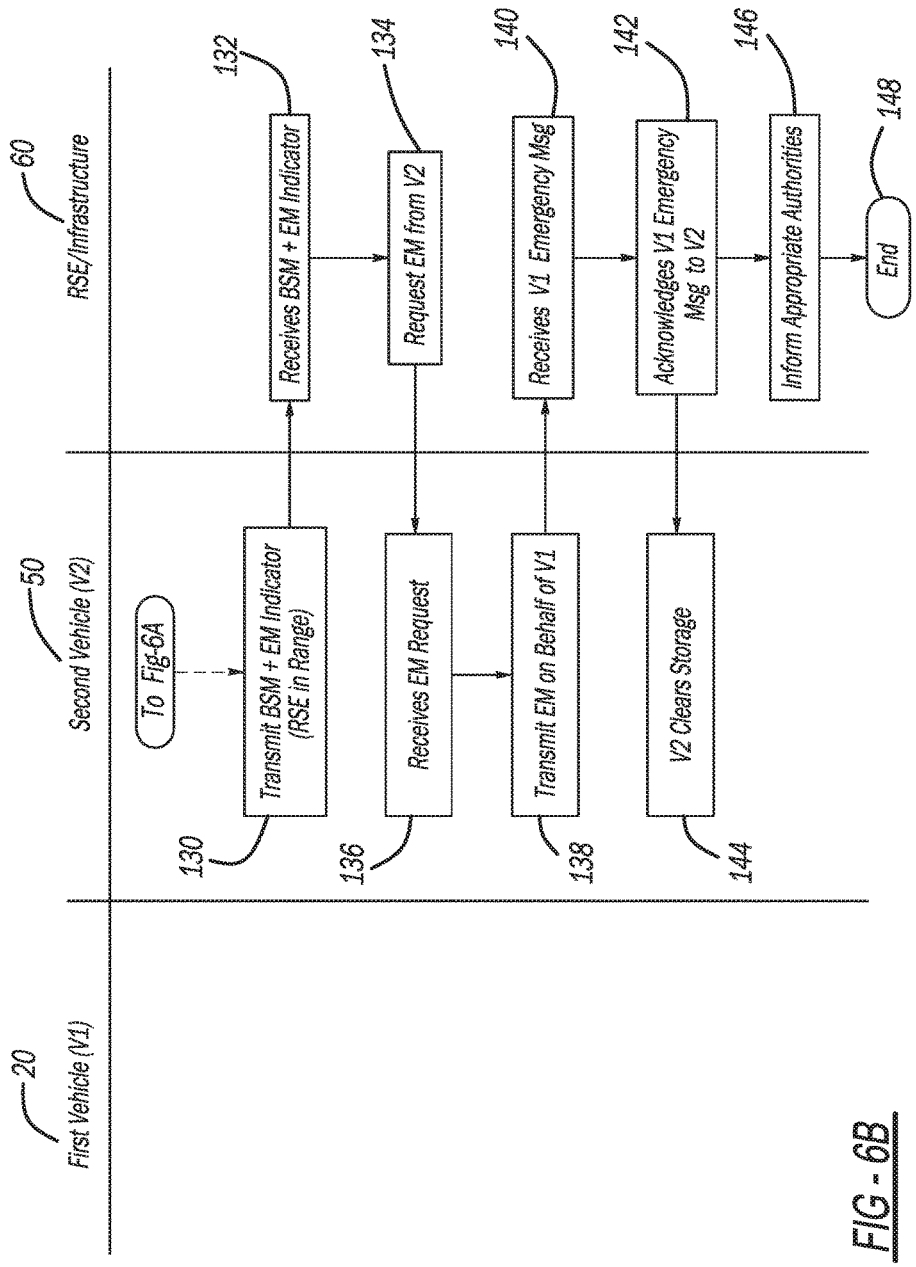

FIGS. 6A and 6B illustrate exemplary message flow 110 for the system 10 between the first vehicle 20, the second vehicle 50, and the RSE 60. The message flow starts at block 112, and at block 114 the control module 22 of the first disabled vehicle 20 listens for receipt of a BSM from the second vehicle 50 at any suitable duty cycle. At blocks 116, the second vehicle 50 transmits its BSM prior to being within communications range of the first vehicle 20. Once the second vehicle 50 is within communications range of the first vehicle 20, at block 118 the BSM of the second vehicle 50 is transmitted, and at block 120 the BSM of the second vehicle 50 is received by the first vehicle 20.

In response to receipt of the BSM from the second vehicle 50, the first vehicle 20 transmits its EM at block 122. At block 124, the EM is received and stored at the second vehicle 50, such as by the control module 52 of the second vehicle 50. At block 126, the control module 52 optionally informs the driver (or other occupants) of the second vehicle 50 that the EM of the first vehicle 20 has been received. At block 128, the control module 52 of the second vehicle 50 will transmit the BSM for the second vehicle 50, and an EM indicator (not the full EM) of the first vehicle 20, either directly to the RSE 60 or indirectly to the RSE 60, such as by way of the third vehicle 70 or one or more aerial vehicles 80. Once the second vehicle 50 is within the range of the RSE 60 at block 130, the RSE 60 will receive the BSM of the second vehicle 50 and the EM indicator of the first vehicle 20 at block 132. At block 134, the RSE 60 requests the full EM from the second vehicle 50. At block 136, the second vehicle 50 receives the request for the full EM, and at block 138 the second vehicle 50 transmits the full EM of the first vehicle 20 to the RSE 60. At block 140, the RSE 60 receives the full EM. At block 142, the RSE 60 sends acknowledgement to the second vehicle 50 acknowledging that the RSE 60 has received the full EM. At block 144, the second vehicle 50, and specifically the control module 52 thereof, can optionally delete the EM of the first vehicle 20 from storage. At block 146, the RSE 60 informs the appropriate emergency assistance authorities that it has received the EM, and either transmits the EM to the emergency assistance authorities directly, or transmits the information of the EM in any other suitable manner. The exemplary message flow 110 for the system 10 ends at block 148.

Figure 7:
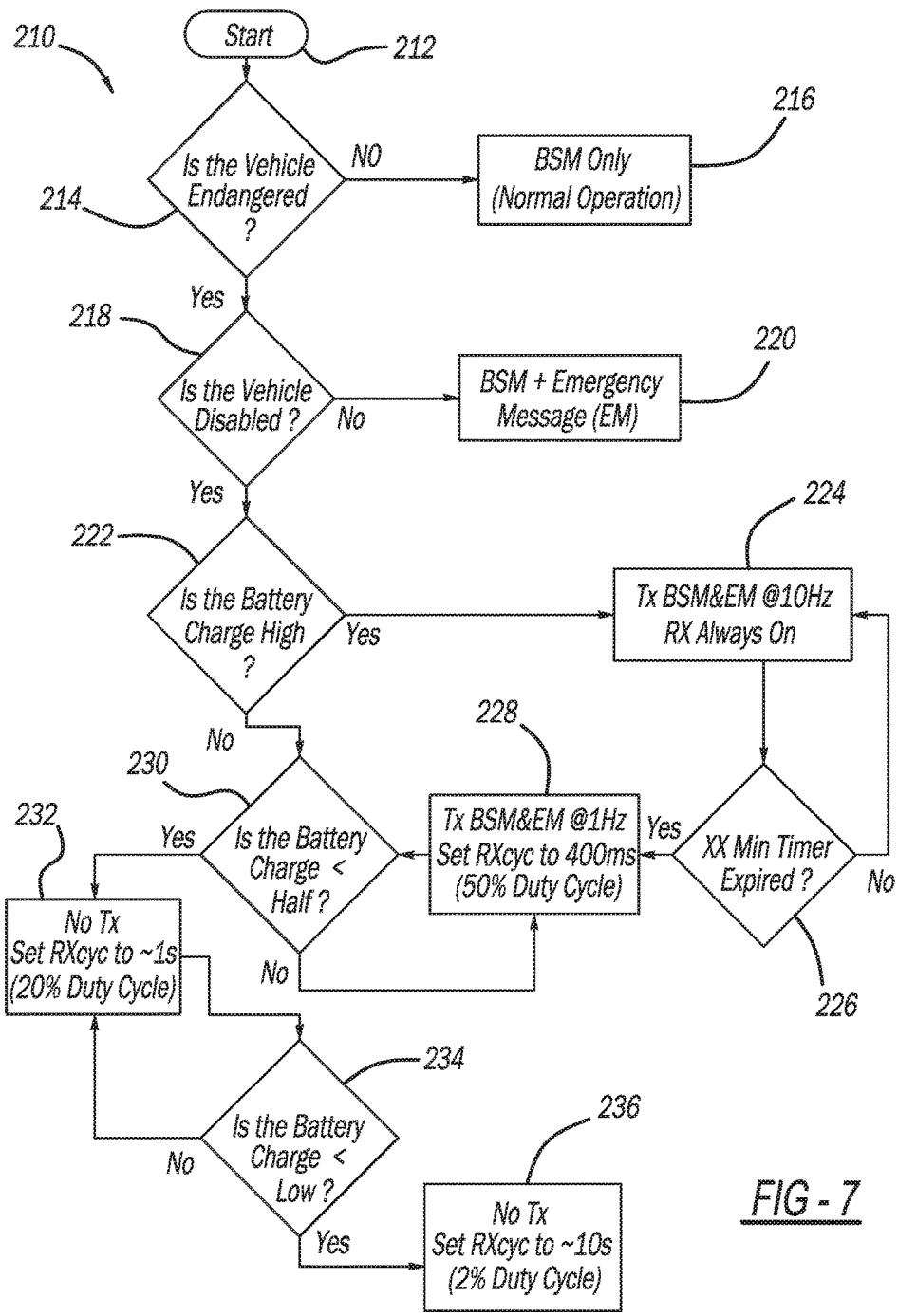
FIG. 7 illustrates a disabled vehicle battery management system for the search and rescue system of the present teachings.

FIG. 7 illustrates an exemplary battery management system 210 for managing the charge of the battery 24 of the first distressed vehicle 20. The battery management system 210 is generally performed by the battery management module 26 and the control module 22. The battery management system 210 begins at block 212, and at block 214 the battery management module 26 sends an inquiry to the control module 22 inquiring as to whether the vehicle 20 is distressed, disabled, or otherwise endangered. If the vehicle 20 is not distressed, disabled, or otherwise endangered, the system 210 proceeds to block 216, and the battery management module 26 instructs the control module 22 to proceed with standard BSM operation in which the BSM of the first vehicle 20 is transmitted in accordance with typical BSM operating procedure.

If at block 214 the control module 22 determines that the first vehicle 20 is distressed, disabled, or otherwise endangered (such as upon analyzing inputs from the vehicle status sensors 40) the battery management system 210 proceeds to block 218. At block 218, the battery management module 26 polls the control module 22 to determine if the first vehicle 20 is disabled. If the first vehicle 20 is disabled, the system 210 proceeds to block 220. At block 220, the control module 22 transmits the emergency message (EM) by way of the transmitter/receiver 30 and the antenna 32.

If block at 218 the control module 22 determines that the first vehicle 20 is disabled, the system 210 proceeds to block 222. At block 222 the battery management module 26 determines whether the charge of the battery 24 is high. If the charge of the battery 24 is determined to be high, such as greater than 80% for example, the system 210 proceeds to block 224. At block 224, the control module 22 transmits the BSM and EM (together or separately) at any suitable standard, relatively high, frequency, such as at 10 Hz, and the control module 22 maintains the receiver of the transmitter/receiver 30 on. The control module 22 transmits the BSM and EM at 10 Hz, and maintains the receiver of the transmitter/receiver 30 active for any suitable predetermined period of time at block 226. After expiration of the predetermined period of time, the system 210 proceeds to block 228. The predetermined period of time corresponds to a time period that upon expiration thereof will result in the charge of the battery 24 being reduced to a medium charge, such as about a 50% charge.

At block 228, after expiration of the predetermined period of time at block 226, the control module 22 reduces the frequency of the BSM and EM transmission, such as to 1 Hz or about 1 Hz. The control module also reduces the receive cycle of the transmitter/receiver 30, such as to 400 milliseconds (50% duty cycle). From block 228, the battery management system 210 proceeds to block 230. The system 210 also proceeds directly to block 230 if at block 222 the battery management module 26 determines that the charge of the battery 24 is not high, such as at or about a half (50%) charge. When the battery charge decreases to less than half, the system 210 proceeds from block 230 to block 232.

At block 232, in order to preserve the charge of the battery 24 the control module 22 refrains from transmitting the BSM and the EM until the first vehicle 20 receives a BSM from another vehicle, such as the second vehicle 50 or an aerial vehicle 80. Also at block 232, in order to preserve the charge of the battery 24 the receive cycle is set to about one second (20% duty cycle). From block 232, the system 210 proceeds to block 234. At block 234, the battery management module 26 determines whether the charge of the battery 24 is low. Once the charge of the battery 24 becomes low (such as less than 10% of the overall capacity), the system 210 proceeds to block 236. At block 232 and 236, the control module 22 further reduces the receive cycle to 10 seconds (2% duty cycle), and only transmits its own BSM and/or EM after receiving the BSM from the second vehicle 50. In this manner, the battery management system 210 advantageously preserves the charge of the battery 24 when the first vehicle 20 is disabled, such as when the engine of the first vehicle 20 is unable to charge the battery 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A search and rescue system comprising:
a first control module for a first vehicle, the first control module configured to identify when the first vehicle is in a distressed situation based on inputs received from a vehicle status sensor, and generate an emergency message including information regarding the distressed situation;
a first transmitter for the first vehicle that transmits the emergency message by way of a first antenna;
a first receiver for the first vehicle that receives a second basic safety message from a second vehicle;
a battery for powering the first transmitter and the first receiver; and
a battery management module configured to measure a charge level of the battery and notify the first control module of the charge level of the battery;
wherein:
when the battery management module determines that the charge level of the battery is high, the first control module instructs the first transmitter to transmit the emergency message at a first frequency, and the first control module maintains the first receiver at a continuously active receive cycle to receive a basic safety message from a second vehicle; and
when the battery management module determines that the charge level of the battery has decreased to a predetermined level, the first control module instructs the first transmitter to transmit the emergency message at a second frequency that is lower than the first frequency, and the first control module sets the first receiver at a first intermittent receive cycle.

2. The search and rescue system of claim 1, wherein when the battery management module determines that the charge level of the battery is medium, the first control module instructs the first transmitter to transmit the emergency message at the second frequency, and the first control module sets the first receiver at the first intermittent receive cycle; and
wherein when the battery management module determines that the charge level of the of the battery is less than medium, but greater than low, the first control module deactivates the transmitter and sets the first receiver at a second intermittent receive cycle that is less frequent than the first intermittent receive cycle.

3. The search and rescue system of claim 2, wherein when the battery management module determines that the charge level of the battery is low the first control module sets the first receiver at a third intermittent receive cycle that is less frequent than the second intermittent receive cycle.

4. The search and rescue system of claim 3, wherein the charge level of the battery is low when the charge level of the battery is less than 10%.

5. The search and rescue system of claim 1, wherein upon expiration of a predetermined period of time after the first battery management module determines that the charge level of the battery is high, the first control module instructs the first transmitter to transmit the emergency message at the second frequency, and the first control module sets the first receiver at the first intermittent receive cycle.

6. The search and rescue system of claim 1, wherein the first frequency at which the emergency message is transmitted is 10 Hz.

7. The search and rescue system of claim 1, wherein the second frequency at which the emergency message is transmitted is 1 Hz.

8. The search and rescue system of claim 1, wherein the first intermittent receive cycle is 400 ms (50% duty cycle).

9. The search and rescue system of claim 2, wherein the second intermittent receive cycle is 1 second (20% duty cycle).

10. The search and rescue system of claim 3, wherein the third intermittent receive cycle is 10 seconds (2% duty cycle).

11. The search and rescue system of claim 1, wherein the first control module is configured to instruct the first transmitter to transmit the emergency message in response to receipt of the second basic safety message from the second vehicle.

12. The search and rescue system of claim 1, wherein transmission of the emergency message is included with, or preceded by, transmission of a first basic safety message for the first vehicle by the first transmitter.

13. The search and rescue system of claim 1, further comprising a second control module of the second vehicle, the second control module is configured to receive and store the emergency message transmitted by the first transmitter of the first vehicle.

14. The search and rescue system of claim 13, wherein the second control module is configured to transmit, and the first control module is configured to receive, acknowledgement of receipt of the emergency message.

15. The search and rescue system of claim 13, wherein the second control module is configured to generate an alert notifying occupants of the second vehicle that the emergency message has been received by the second control module.

16. The search and rescue system of claim 13, wherein the second control module is configured to generate an emergency message indicator, which indicates that the second control module has received the emergency message from the first vehicle, and instruct the second transmitter to transmit the emergency message indicator.

17. The search and rescue system of claim 16, wherein in response to receipt of a request from road-side equipment that has received the emergency message, the second control module is configured to transmit the emergency message to road-side equipment for the road-side equipment to request emergency assistance.

18. A search and rescue system comprising:
a first control module for a first vehicle, the first control module configured to identify when the first vehicle is in a distressed situation based on inputs received from a vehicle status sensor, and generate an emergency message including information regarding the distressed situation;
a first transmitter for the first vehicle that transmits the emergency message by way of a first antenna;
a first receiver for the first vehicle that receives a second basic safety message from a second vehicle;
a battery for powering the first transmitter and the first receiver; and
a battery management module configured to measure a charge level of the battery and notify the first control module of the charge level of the battery;
wherein:

when the battery management module determines that the battery charge is at a first level that is greater than a second level, the first control module instructs the first transmitter to transmit the emergency message at a first frequency, and the first control module activates the first receiver to receive a basic safety message from the second vehicle;

after expiration of a predetermined period of time from when the battery management module determines that the battery charge is at the first level, the first control module instructs the first transmitter to transmit the emergency message at a second frequency that is lower than the first frequency, and the first control module sets the first receiver at a first intermittent receive cycle;

when the battery management module determines that the battery charge is less than the second level but greater than a third level, the first control module instructs the first transmitter to refrain from transmitting the basic safety message until the first receiver receives the second basic safety message from the second vehicle, and the first control module sets the first receiver at a second intermittent receive cycle that is less frequent than the first intermittent receive cycle;

when the battery management module determines that the battery charge is less than the third level, the first control module instructs the first transmitter to refrain from transmitting the basic safety message until the first receiver receives the second basic safety message from the second vehicle, and the first control module sets the first receiver at a third intermittent receive cycle that is less frequent than the second intermittent receive cycle.

19. The search and rescue system of claim 18, wherein the first frequency is 10 Hz, the second frequency is 1 Hz, the first intermittent receive cycle is 400 ms (50% duty cycle), the second intermittent receive cycle is 1 second (20% duty cycle), and the third intermittent receive cycle is 10 seconds (2% duty cycle).

20. The search and rescue system of claim 18, wherein the second level of charge of the battery is 50% charge capacity of the battery, and the third level of charge of the battery is 10% charge capacity of the battery.

\* \* \* \* \*

UNITED STATES PATENT AND TRADEMARK OFFICE
CERTIFICATE OF CORRECTION

PATENT NO. : 10,210,762 B1  
APPLICATION NO. : 15/716813  
DATED : February 19, 2019  
INVENTOR(S) : Kevin Dotzler Page 1 of 1

It is certified that error appears in the above-identified patent and that said Letters Patent is hereby corrected as shown below:

In the Claims

Column 9, Line 48, In Claim 2, delete "of the of the" and insert --of the-- therefor Signed and Sealed this
Eleventh Day of June, 2019

Andrei Iancu
*Director of the United States Patent and Trademark Office*